US012534689B1

(12) United States Patent
Li et al.

(10) Patent No.: US 12,534,689 B1
(45) Date of Patent: Jan. 27, 2026

(54) FABRIC-SOFTENING, GARMENT-CARE AND STAIN-REMOVING DETERGENT COMPOSITION, PREPARATION METHOD THEREOF AND DETERGENT TABLET

(71) Applicant: Guangzhou Joyson Cleaning Products Co., Ltd., Guangdong (CN)

(72) Inventors: Fenglei Li, Guangdong (CN); Jieer Luo, Guangdong (CN); Junli Li, Guangdong (CN); Jianfeng Sun, Guangdong (CN); Jieting Yan, Guangdong (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 0 days.

(21) Appl. No.: 19/295,834

(22) Filed: Aug. 11, 2025

Related U.S. Application Data

(63) Continuation of application No. PCT/CN2025/108549, filed on Jul. 15, 2025.

(51) Int. Cl.
*C11D 1/02* (2006.01)
*C11D 1/66* (2006.01)
(Continued)

(52) U.S. Cl.
CPC ................ *C11D 3/222* (2013.01); *C11D 1/94* (2013.01); *C11D 3/001* (2013.01); *C11D 3/2044* (2013.01);
(Continued)

(58) Field of Classification Search
CPC .. C11D 1/02; C11D 1/66; C11D 1/662; C11D 1/83; C11D 1/88; C11D 3/2065;
(Continued)

(56) References Cited

U.S. PATENT DOCUMENTS 7,199,096 B1 4/2007 Weuthen
11,760,962 B1 9/2023 Sun et al.
(Continued)

FOREIGN PATENT DOCUMENTS

AU 2024205605 B1 * 2/2025 ........... C11D 17/042
WO 2014158472 A1 10/2014

OTHER PUBLICATIONS

China's national standards, "Paper-Determination of softness", Dec. 13, 2016, 11 pages.
(Continued)

*Primary Examiner* — Brian P Mruk
(74) *Attorney, Agent, or Firm* — Cooper Legal Group, LLC

(57) ABSTRACT

Disclosed is a fabric-softening, garment-care and stain-removing detergent composition, a preparation method thereof and a detergent tablet. A raw materials for preparing the fabric-softening, garment-care and stain-removing detergent composition includes the following components by mass percentages: anionic surfactant: 5-30%, nonionic surfactant: 5-20%: amphoteric surfactant: 1-10%; plant polysaccharide: 10-35%; builder: 5-20%; shape promoting agent: 2-10%; softening and antistatic agent: 0.5-5%; enzymatic preparation: 0-5%; chelating agent: 0.1-5%; essence: 0-5%; and a balance of water; a mass ratio of a total surfactant to the plant polysaccharide is (0.9-5):1, a mass ratio of the anionic surfactant to the softening and antistatic agent is (3-17):1. The present application achieves the effect of producing more environmentally friendly detergent products with excellent softening and stain-removing capabilities.

8 Claims, 1 Drawing Sheet

(51) Int. Cl.

| | |
|---|---|
| ***C11D 1/83*** | (2006.01) |
| ***C11D 1/88*** | (2006.01) |
| ***C11D 1/94*** | (2006.01) |
| ***C11D 3/00*** | (2006.01) |
| ***C11D 3/20*** | (2006.01) |
| ***C11D 3/22*** | (2006.01) |
| ***C11D 3/30*** | (2006.01) |
| ***C11D 3/34*** | (2006.01) |
| ***C11D 3/38*** | (2006.01) |
| ***C11D 3/386*** | (2006.01) |
| ***C11D 11/00*** | (2006.01) |
| ***C11D 17/06*** | (2006.01) |

(52) U.S. Cl.

CPC .............. *C11D 3/2048* (2013.01); *C11D 3/30* (2013.01); *C11D 3/3409* (2013.01); *C11D 3/38* (2013.01); *C11D 17/06* (2013.01); *C11D 2111/12* (2024.01)

(58) Field of Classification Search

CPC ......... C11D 3/22; C11D 3/227; C11D 3/3707; C11D 3/373; C11D 3/386; C11D 11/00; C11D 11/0064; C11D 17/0073

See application file for complete search history.

(56) References Cited

U.S. PATENT DOCUMENTS

| | | | | |
|---|---|---|---|---|
| 12,281,285 B1 | 4/2025 | Li et al. | | |
| 2006/0223739 A1* | 10/2006 | Zhu | ........................ C11D 10/04 | 510/473 |
| 2023/0174898 A1* | 6/2023 | Anderson | ................ C11D 3/10 | 510/331 |
| 2024/0209294 A1 | 6/2024 | Sun et al. | | |
| 2024/0228915 A1 | 7/2024 | Sun et al. | | |
| 2025/0066698 A1 | 2/2025 | Sun et al. | | |

OTHER PUBLICATIONS

China's national standards, "Determination of antistatic properties of fabric conditioners", Dec. 31, 2013, 28 pages.

People's Republic of China (PRC) national standard, "Determination of detergency and cyclic washing performance of detergents for clothing", Mar. 9, 2021, 55 pages.

People's Republic of China (PRC) light industry standard, "Determination of rewetting performance of fabric softener", Apr. 21, 2023, 18 pages.

People's Republic of China (PRC) light industry standard, "Laundry tablets", Apr. 21, 2023, 16 pages.

People's Republic of China (PRC) national standard, "Test method for biodegradability of surfactants", Dec. 28, 2018, 40 pages.

The Chinese people National standards of the Republic, "Kitchen oil cleaner", Feb. 6, 2018, 23 pages.

People's Republic of China (PRC) national standard, "Technical specification for safety of washing products", May 12, 2011, 12 pages.

People's Republic of China (PRC) light industry standard, "Hard floor cleaning agent", Oct. 17, 2013, 19 pages.

Non-Final Office Action received in corresponding U.S. Appl. No. 19/305,858, dated Oct. 27, 2025, 12 pages.

Non-Final Office Action received in corresponding U.S. Appl. No. 19/305,890, dated Oct. 31, 2025, 15 pages.

* cited by examiner

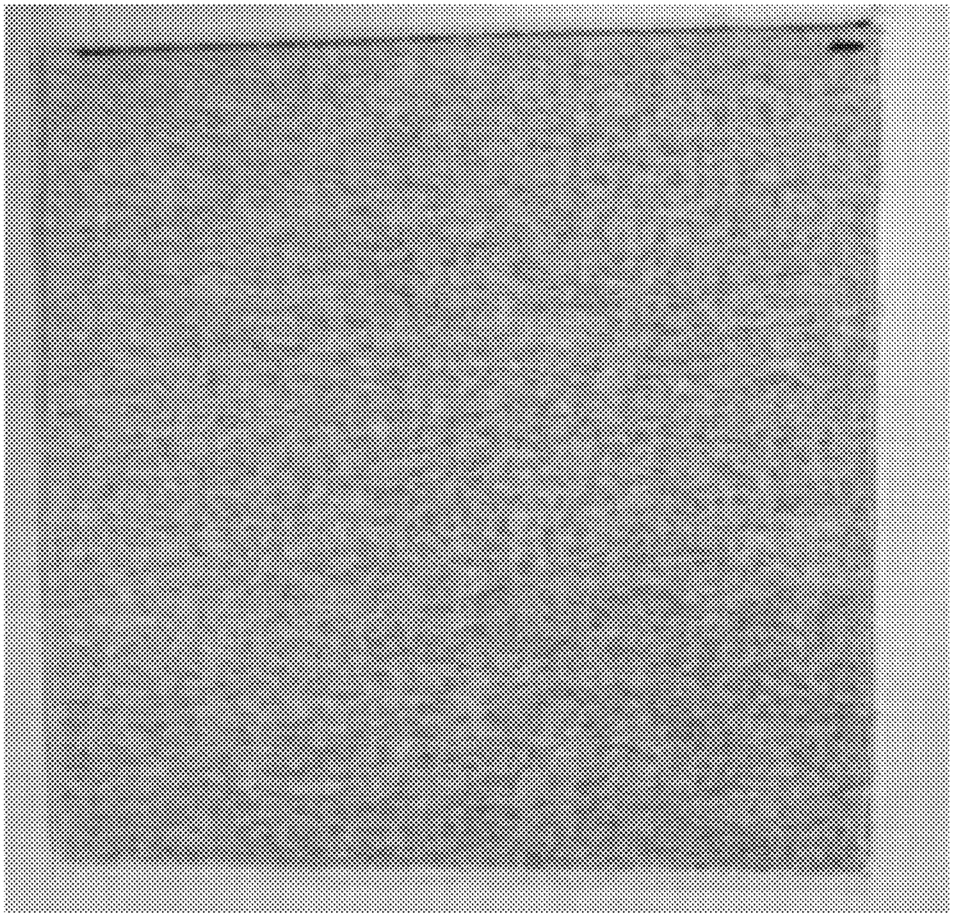

FABRIC-SOFTENING, GARMENT-CARE AND STAIN-REMOVING DETERGENT COMPOSITION, PREPARATION METHOD THEREOF AND DETERGENT TABLET

CROSS-REFERENCE TO RELATED APPLICATION

The present application is a continuation of PCT application serial no. PCT/CN2025/108549, filed on Jul. 15, 2025. The entirety of PCT application serial no. PCT/CN2025/108549 is hereby incorporated by reference herein and made a part of this specification.

TECHNICAL FIELD

The present application relates to the field of detergent products, and more particularly to a fabric-softening, garment-care and stain-removing detergent composition, a preparation method thereof and a detergent tablet.

BACKGROUND ART

Laundry tablet, also referred to as laundry sheet, as a novel solid detergent, has gained market attention in recent years due to advantages of portability, convenient dosing, and low residue.

In existing laundry tablets, strongly cationic surfactants are added as softening agents along with thermostable proteases and cellulases as stain-removing enhancers, which enables the laundry tablets to achieve both softening and excellent stain-removing effects. However, the preparation method involves dissolving polyvinyl alcohol (PVA) at 90° C., cooling to 40° C. to add the softening agent and thermostable enzyme preparation, followed by drying and sheet-forming at 90 to 105° C. This process requires high-temperature heating during both slurry preparation and sheet formation. During continuous slurry preparation and sheet formation operations, the high temperature accelerates the corrosion of stainless-steel equipment by cationic surfactants. Additionally, the elevated temperature promotes charge neutralization between cationic and anionic species and accelerates the oxidation of hydroxyethyl quaternary ammonium softeners, leading to partial loss of stain-removing and softening performance. Although thermostable enzymes perform well under high temperatures, their enzymatic efficiency may significantly decrease in medium-to-low temperature environments, limiting their application in non-high-temperature scenarios, such as winter.

PVA is currently an essential and extensively used film-forming agent in detergent tablets. Although PVA with specific molecular weights is biodegradable, some regions impose strict restrictions on the use of PVA in detergent products.

SUMMARY

In order to prepare a more environmentally friendly detergent product with excellent softening and stain-removing capabilities, the present application provides a detergent composition, a preparation method thereof and a detergent tablet.

In a first aspect, the present application provides a detergent composition adopting the following technical solution.

A detergent composition, wherein a raw material for preparing the detergent composition includes the following components by mass percentages:

anionic surfactant: 5-30%, nonionic surfactant: 5-20%: amphoteric surfactant: 1-10%; plant polysaccharide: 10-35%; builder: 5-20%; shape promoting agent: 2-10%; softening and antistatic agent: 0.5-5%; enzymatic preparation: 0-5%; chelating agent: 0.1-5%; essence: 0-5%; and a balance of water;

a ratio of a total mass of the anionic surfactant, the nonionic surfactant and the amphoteric surfactant to a mass of the plant polysaccharide is (0.9-5):1, a mass ratio of the anionic surfactant to the softening and antistatic agent is (3-17):1, the softening and antistatic agent includes a strongly cationic softening and antistatic agent and a nonionic to weakly cationic softening and antistatic agent.

According to the above technical solution, the anionic and nonionic surfactants are used to achieve synergistic stain-removing, the amphoteric surfactant acts as buffer, the strongly cation softening and antistatic agent provides instant softening, and the nonionic to weakly cationic softening and antistatic agent offers long-term care, thereby forming a quaternary synergistic system. Simultaneously, the plant polysaccharide replaces the polyvinyl alcohol, enabling rapid disintegration in cold water, complete biodegradability, and fabric fiber protection, while the controlled ratio between the anionic surfactant and softening and antistatic agent ensures compatibility of both functionalities.

Furthermore, the plant polysaccharide forms a gel network after tablet disintegration, which delays rapid release of the strongly cationic softening and antistatic agent and prevents flocculation caused by localized high concentration; the plant polysaccharide also encapsulates anionic/cationic active components to establish physical barriers, thereby reducing unintended reactions during processing and storage.

Alternatively, a mass ratio of the strongly cationic softening and antistatic agent to the nonionic to weakly cationic softening and antistatic agent is (1-10):1.

By using the above technical solution, the ratio between the two softening and antistatic agents is controlled to synergistically enhance both softening and antistatic performance, while maintaining compatibility with the anionic surfactant without compromising the overall stain-removing performance and final softening effect.

Alternatively, the plant polysaccharide includes one or more of hydroxypropyl starch ether, hydroxypropyl methyl cellulose, carboxymethyl chitosan, guar gum, Arabic gum, locust bean gum, cassia gum, xanthan gum, alginate, and sodium carboxymethyl cellulose.

By using the above technical solution, the plant polysaccharide enables the slurry of the detergent composition to maintain dense foam, which facilitates the formation of detergent tablets. Furthermore, the plant polysaccharide possesses inherent softening properties that reduce static adsorption and minimize fabric pilling. The active groups (such as hydroxyl and carboxyl groups) in thermonuclear structure of the plant polysaccharide can form hydrogen bonds or electrostatic adsorption with fiber surfaces, creating a lubricating layer that reduces the friction coefficient between fibers. During machine washing, this protective mechanism safeguards fibers and reduces mechanical damage.

Alternatively, the strongly cationic softening and antistatic agent includes one or more of cationic wheat protein derivatives, quaternized wheat protein, methyl sulfate

[ethoxylated cocoalkyl bis(hydroxyethyl) ammonium formate], and dodecyl hydroxyethyl quaternary ammonium salt.

By using the above technical solution, the wheat protein-based softening and antistatic agent exhibits excellent wettability to fabrics and affinity to natural fibers, enabling natural deposition on fabrics. The wheat protein-based softening and antistatic agent adsorbs moisture onto fibers to improve fabric texture and hand feel, while penetrating into fibers for deep conditioning, which results in smoother fabric surfaces and enhanced fiber strength and lubricity. Furthermore, the methyl sulfate [ethoxylated cocoalkyl bis (hydroxyethyl) ammonium formate] and dodecyl hydroxyethyl quaternary ammonium salt, through the introduction of hydroxyethyl groups in molecular structures, significantly reduce cationic charge density while enhancing hydrophilicity, which effectively minimizes electrostatic neutralization reactions with the anionic surfactant.

Alternatively, the nonionic to weakly cationic softening and antistatic agent includes one or more of hydrolyzed wheat protein/silicone copolymer, hydrolyzed wheat protein/PVP copolymer, and Crodastat 400.

By using the above technical solution, the present application achieves both instant softening through the strongly cation softening and antistatic agent and long-term care through the nonionic to weakly cationic softening and antistatic agent, while maintaining compatibility with the anionic surfactant to reduce unintended reactions, thereby ensuring stain-removing or softening effect.

Alternatively, the anionic surfactant includes one or more of sodium α-olefin sulfonate, sodium fatty alcohol polyoxyethylene ether sulfate, $C_8$-$C_{22}$ fatty acid salt, modified oil ethoxylated sulfonate, and fatty acid methyl ester ethoxylate sulfonate.

Alternatively, the nonionic surfactant includes one or more of alkyl polyglucoside, coconut acid methyl ester ethoxylate, modified oil ethoxylate, secondary alcohol ethoxylate, isotridecanol ethoxylate, and polyoxyethylene-polyoxypropylene block copolymer; and the amphoteric surfactant includes one or more of dodecyl dimethyl betaine, cocamido propyl hydroxy sulfobetaine, cocoalkyl dimethylamine oxide, and cocoalkyl bis(hydroxyethyl)amine oxide.

By using the above-mentioned technical solution, a surfactant system is established including the anionic and nonionic surfactants for stain-removing and the amphoteric surfactant for buffering, thereby enhancing stain-removing performance.

Alternatively, the shape promoting agent includes a $C_3$-$C_8$ polyol.

By using the above technical solution, the $C_3$-$C_8$ polyol can combine with multiple reaction sites of the plant polysaccharide to form a three-dimensional network structure and increase the crosslinking density, thereby better shaping of the detergent tablet and improving the toughness of the detergent tablet.

Alternatively, the shape promoting agent includes one or more of glycerol, propylene glycol, butanediol, pentanediol, hexanediol, heptanediol, and octanediol.

Alternatively, a mass ratio of the plant polysaccharide to the shape promoting agent is (2-6):1.

Alternatively, the builder includes one or more of plant starch, kaolin, bentonite, and silicon dioxide.

Alternatively, the plant starch includes one or more of commercially available starches including soybean starch, cassava starch, corn starch, pea starch, and sweet potato starch.

Alternatively, the chelating agent includes one or more of citric acid and salts thereof, gluconic acid and salts thereof, glucoheptonic acid and salts thereof, tetrasodium glutamate diacetate, trisodium methylglycine diacetate, and sodium ethylenediamine disuccinate.

Alternatively, the enzymatic preparation includes one or more of anti-color-transfer enzymes, proteases, cellulases, phosphodiesterases, amylases, pectinases, mannanases, and lipases.

Alternatively, the enzymatic preparation includes at least one of the enzyme preparation in liquid form and the enzyme preparation in solid form.

By using the above technical solution, the enzyme preparation in liquid form can be added during preparation of the slurry and the enzyme preparation in solid form can be added during preparation of the detergent tablet.

Alternatively, the raw material further includes plant extracts and/or dyes.

In a second aspect, the present application provides a method for preparing the detergent composition, adopting the following technical solution.

A method for preparing the detergent composition, including the following steps:

- mixing the plant polysaccharide with the shape promoting agent under stirring to wet a solid powder of the plant polysaccharide with the shape promoting agent to obtain a premix;
- mixing the anionic surfactant with a pre-heated water, and after standing until completely dissolved into a homogeneous phase, adding the premix in batches under stirring to obtain a mixture;
- adding the builder to the mixture, stirring until uniform, then adding the nonionic surfactant and the amphoteric surfactant, adding the chelating agent to adjust a value of pH to 5.5-7, then adding the softening and antistatic agent, continuing the stirring, and adding the enzymatic preparation in liquid form and the essence to obtain the detergent composition.

Alternatively, the detergent composition may further include plant extracts and/or dyes.

Alternatively, a viscosity of the mixture is controlled in the range of 5000-30000 mpa·S.

In a third aspect, the present application provides a detergent tablet, adopting the following technical solution.

A detergent tablet, produced by drying and then slicing the detergent composition; if the enzymatic preparation in the detergent composition is in solid form, the enzymatic preparation is not added during preparation of the detergent composition, but is instead sprinkled onto sliced tablets.

Alternatively, the detergent composition is dried by a casting method, where the slurry of the detergent composition is cast and then formed through air-blowing drying equipment.

In summary, the application has the following technical effects:

In the present application, the anionic and nonionic surfactants are used to achieve synergistic stain-removing, the amphoteric surfactant acts as buffer, the strongly cation softening and antistatic agent provides instant softening, and the nonionic to weakly cationic softening and antistatic agent offers long-term care, thereby forming a quaternary synergistic system. Simultaneously, the plant polysaccharide replaces the polyvinyl alcohol, enabling rapid disintegration in cold water, complete biodegradability, and fabric fiber protection. The plant polysaccharide forms a gel network after tablet disintegration, which delays rapid release of the strongly cationic softening and antistatic agent and prevents flocculation caused by localized high concentration; the plant polysaccharide also encapsulates anionic/cationic active components to establish physical barriers, thereby reducing unintended reactions during processing and storage.

BRIEF DESCRIPTION OF THE DRAWINGS

FIG. 1 shows shaping conditions of pre-wash and post-wash fabrics in the cashmere washing test of Application Example 1 of the present application.

DETAILED DESCRIPTION

The present application is further described in detail below with reference to FIG. 1.

Example 1

A detergent composition, wherein a raw material for preparing the detergent composition included the following components by mass percentages:

- anionic surfactant: 30%; nonionic surfactant: 15%; amphoteric surfactant: 5%; plant polysaccharide: 11%; builder: 10%; shape promoting agent: 2.5%; strongly cationic softening and antistatic agent 4%; nonionic to weakly cationic softening and antistatic agent: 0.5%; enzymatic preparation: 1.4%; chelating agent: 0.1%; essence: 1%; and water: 19%.

Specifically, the anionic surfactant included 21% of sodium $C_{14}$ $\alpha$-olefin sulfonate and 9% modified oil ethoxylated sulfonate; the nonionic surfactant was a modified grease ethoxy compound; the amphoteric surfactant was dodecyl dimethyl betaine; the plant polysaccharide was hydroxypropyl starch ether; the builder was natural acicular silicate; the shape promoting agent was glycerol; the strongly cationic softening and antistatic agent was dodecyl hydroxyethyl quaternary ammonium salt; the nonionic to weakly cationic softening and antistatic agent was a hydrolyzed wheat protein/silicone copolymer; the enzymatic preparation was in liquid form and included 0.5% protease, 0.5% amylase and 0.4% lipase phosphodiesterase; the chelating agent was trisodium methylglycine diacetate; and the plant extract was Sapindus mukorossi extract.

A method for preparing the detergent composition, which included the following steps:

- the plant polysaccharide was mixed with the shape promoting agent under stirring to wet a solid powder of the plant polysaccharide with the shape promoting agent to obtain a premix.
- the anionic surfactant was mixed with the water at 45° C., after standing until completely dissolved into a homogeneous phase, a resulting mixture was transferred to a blender, then the premix was added in batches and stirred at a speed of 1050 r/min for 20 minutes, so that the plant polysaccharide absorbed the water sufficiently and swelled to obtain a mixture, wherein a viscosity of the mixture was controlled to be 15000±5000 mpa·S.
- the builder was added to the mixture and stirred until uniform; after the mixture turned from pale yellow to pure white, then the nonionic surfactant and the amphoteric surfactant were sequentially added; the chelating agent was added to adjust a value of pH to 5.5-7; then the strongly cationic softening and antistatic agent and the nonionic to weakly cationic softening and antistatic agent were added and stirred until uniform; then the enzymatic preparation, the essence and the plant extract were added; and stirring was continued to obtain the detergent composition.

Examples 2-14

The difference between Examples 2-14 and Example 1 lies in that the raw materials for preparing the detergent compositions are different, specifically as shown in Tables 1 and 2.

TABLE 1

| Mass percentage/% | | Example 1 | Example 2 | Example 3 | Example 4 | Example 5 | Example 6 | Example 7 |
|---|---|---|---|---|---|---|---|---|
| Plant polysaccharide | Hydroxypropyl starch ether | 11 | | | | | | |
| | Hydroxypropyl methylcellulose | | 14 | | | | | |
| | Guar gum | | | 15 | | | | |
| | Arabic gum | | | | 18 | | | |
| | Locust bean gum | | | | | 20 | | |
| | Cassia seed gum | | | | | | 25 | |
| | Xanthan Gum | | | | | | | 30 |
| | Carboxymethyl chitosan | | | | | | | |
| | Carboxymethyl cellulose | | | | | | | |
| | Sodium Alginate | | | | | | | |
| Anionic surfacant | Sodium $C_{14}$ $\alpha$-olefin sulfonate | 21 | | | | | 2 | 5 |
| | Sodium fatty alcohol polyethenoxy ether sulfate | | 23 | | 15 | 11 | | |
| | Modified oil ethoxylated sulfonate | 9 | | | | 10 | | 15 |
| | Fatty acid methyl ester ethoxylate sulfonate | | | 21 | | | 18 | |
| | $C_{12}$ fatty acid salt | | | | 10 | | 1 | 5 |
| Nonionic surfactant | Alkyl polyglucoside | | 2 | | | | | 1 |
| | Coconut acid methyl ester ethoxylate | | 1 | | | 7 | | 1 |
| | Modified grease ethoxy compound | 15 | | | 3 | | | 1 |
| | Secondary alcohol ethoxylate | | | 6 | | | 7 | 1 |
| | Isotridecanol ethoxylate | | | | 2 | | | 1 |
| | Polyoxyethylene-polyoxypropylene block copolymer | | 10 | | 2 | | | 1 |
| Amphoteric surfactant | Dodecyl dimethyl betaine | 5 | | | 2 | | | |
| | Coamido propyl hydroxy sulfobetaine | | 2 | 2 | | 4 | 5 | |
| | Cocoalkyl dimethylamine oxide | | | | 1 | | | |
| | Cocoalkyl bis(hydroxyethyl)amine oxide | | 1 | | | | 2 | 4 |

TABLE 1-continued

| Mass percentage/% | | Example 1 | Example 2 | Example 3 | Example 4 | Example 5 | Example 6 | Example 7 |
|---|---|---|---|---|---|---|---|---|
| Strongly cationic softening and antistatic agent | Cationic wheat protein derivative | | | | | 1 | | |
| | Dodecyl hydroxyethyl quaternary ammonium salt | 4 | | 4 | | 1 | | 1.5 |
| | Quaternized wheat protein | | | | 3 | | 2 | |
| | Methyl sulfate [ethoxylated cocoalkyl bis(hydroxyethyl) ammonium formate] | | 3 | | | 1 | | |
| Nonionic to weakly cationic softening and antistatic agent | Crodastat 400 | | | | | 0.5 | 1 | |
| | Hydrolyzed wheat protein/PVP copolymer | | 1 | | | 0.5 | 0.5 | 0.5 |
| | Hydrolyzed wheat protein/silicone copolymer | 0.5 | | 0.5 | 1.5 | | 0.5 | |
| Builder | Plant starch | | 6 | | | | 2 | |
| | Bentonite | | | 13 | | 5 | | |
| | Silica | | | | 10 | 2 | | 5 |
| | Natural phyllosilicate | 10 | | | | | 5 | |
| Shape promoting agent | Propylene glycol | | | | | | | |
| | Glycerol | 2.5 | 3 | | | | | 7 |
| | Butandiol | | | | | | | |
| | Hexanediol | | | 3 | | 6 | 8 | |
| | Isohexylene glycol | | | | | | | |
| | Heptanediol | | | | | | | |
| | Octanediol | | | | 5 | | | |
| Enzymatic preparation | Anti-color-transfer enzyme | 0.5 | | | | | | |
| | Protease | 0.5 | 0.5 | 0.5 | 0.5 | | 0.5 | 0.5 |
| | Amylase | | | 0.5 | | | | 0.3 |
| | Cellulase | | 0.5 | | | | | |
| | Pectinase | | 0.5 | | | | | |
| | Mannanase | 0.4 | | | | | | |
| | Lipase | | | | | 0.5 | | |
| | Phosphodiesterase | | 0.3 | | | | | |
| Chelating agent | Sodium citrate | | | | | | | 0.2 |
| | Sodium gluconate | | | | 0.1 | | | |
| | Tetrasodium glutamate diacetate | | | 0.4 | | | 1.5 | |
| | Trisodium methylglycine diacetate | 0.1 | | | | | | |
| | Sodium ethylenediamine disuccinate | | | 0.1 | | 2.5 | | |
| | Sodium glucoheptonate | | 0.2 | | | | | |
| Essence | | 1 | 1 | 1 | | | | |
| Plant extract | | 0.5 | | | 0.5 | | | |
| Water | | 19 | 31 | 33 | 26.4 | 28 | 19 | 20 |
| Total | | 100 | 100 | 100 | 100 | 100 | 100 | 100 |
| Total surfactant: plant polysaccharide | | 4.55 | 2.79 | 1.93 | 1.94 | 1.60 | 1.40 | 1.17 |
| Plant polysaccharide: shape promoting agent | | 4.40 | 4.67 | 5 | 3.60 | 3.33 | 3.13 | 4.29 |
| Anionic surfactant: softening and antistatic agent | | 6.67 | 5.75 | 4.67 | 5.56 | 5.25 | 5.25 | 12.5 |
| Strongly cationic softening and antistatic agent: nonionic to weakly cationic softening and antistatic agent | | 8 | 3 | 8 | 2 | 3 | 1 | 3 |

TABLE 2

| Mass percentage/% | | Example 8 | Example 9 | Example 10 | Example 11 | Example 12 | Example 13 | Example 14 |
|---|---|---|---|---|---|---|---|---|
| Plant polysaccharide | Hydroxypropyl starch ether | | | | 2 | 4 | | |
| | Hydroxypropyl methylcellulose | | | | 2 | | | |
| | Guar gum | | | | 2 | 5 | | |
| | Arabic gum | | | | 2 | | | |
| | Locust bean gum | | | | 2 | | | |
| | Cassia seed gum | | | | 2 | | | |
| | Xanthan Gum | | | | 2 | 4 | | |
| | Carboxymethyl chitosan | 34 | | | 2 | | | |
| | Carboxymethyl cellulose | | 10 | | 2 | | | |
| | Sodium Alginate | | | 22 | 3 | | 10 | 15 |
| Anionic surfactant | Sodium $C_{14}$ α-olefin sulfonate | 20 | | | 1 | 20.5 | 5 | |
| | Sodium fatty alcohol polyethenoxy ether sulfate | | 21 | | 1 | | | 15 |
| | Modified oil ethoxylated sulfonate | 2 | | | 13 | | | |
| | Fatty acid methyl ester ethoxylate sulfonate | | | | 3 | | | |
| | $C_{12}$ fatty acid salt | | | 21 | 4 | | | |
| Nonionic surfactant | Alkyl polyglucoside | | 5 | 2 | | | | |
| | Coconut acid methyl ester ethoxylate | | 10 | | | | | |
| | Modified grease ethoxy compound | | | 2 | | 3 | 10 | 10 |
| | Secondary alcohol ethoxylate | | | | 5 | | | |
| | Isotridecanol ethoxylate | 6 | | 2 | | 2 | | |

TABLE 2-continued

| | Mass percentage/% | Example 8 | Example 9 | Example 10 | Example 11 | Example 12 | Example 13 | Example 14 |
|---|---|---|---|---|---|---|---|---|
| | Polyoxyethylene-polyoxypropylene block copolymer | | 2 | | | | | |
| Amphoteric surfactant | Dodecyl dimethyl betaine | | 5 | 4 | | | 1 | |
| | Coamido propyl hydroxy sulfobetaine | 5 | 1 | | 5 | 4 | | 1 |
| | Cocoalkyl dimethylamine oxide | | 1 | | 2 | 1 | 0.5 | 0.5 |
| | Cocoalkyl bis(hydroxyethyl)amine oxide | | 1 | 1 | | 1 | | |
| Strongly cationic softening and antistatic agent | Cationic wheat protein derivative | | | 1 | 1.5 | | 0.5 | |
| | Dodecyl hydroxyethyl quaternary ammoniumsalt | 4 | 1 | 1 | | | | |
| | Quaternized wheat protein | | | 1 | 1.5 | | | |
| | Methyl sulfate [ethoxylated cocoalkyl bis(hydroxyethyl) ammonium formate] | | 1 | 1 | | 4.5 | | 0.45 |
| Nonionic to weakly cationic softening and antistatic agent | Crodastat 400 | | | | 0.5 | | | |
| | Hydrolyzed wheat protein/PVP copolymer | | 1 | 0.5 | | 0.5 | 0.5 | |
| | Hydrolyzed wheat protein/silicone copolymer | 0.5 | | | 0.5 | | | 0.45 |
| Builder | Plant starch | 5 | | | 8 | 5 | | |
| | Bentonite | | | 9 | | 2 | 2 | 2 |
| | Silica | | 3 | | | 2 | | |
| | Natural phyllosilicate | | 5 | | | 2 | | |
| Shape promoting agent | Propylene glycol | | 2 | 2 | | | | |
| | Glycerol | 8 | | 3 | | | 3 | |
| | Butandiol | | | 1 | | | | 3 |
| | Hexanediol | | 2 | | 4 | | | |
| | Isohexylene glycol | | | | | | | |
| | Heptanediol | | | | | 4.5 | | |
| | Octanediol | | | | | | | |
| Enzymatic preparation | Anti-color-transfer enzyme | 0.5 | | | | | | |
| | Protease | | 0.5 | 0.5 | | 0.5 | 1.5 | 0.5 |
| | Amylase | | 0.5 | 0.5 | | | 0.5 | |
| | Cellulase | | | 0.5 | | | 0.5 | |
| | Pectinase | | | | | | 1.5 | |
| | Mannanase | | | | | | 0.5 | |
| | Lipase | 1 | | | 0.5 | 0.5 | | |
| | Phosphodiesterase | | | | 0.5 | 0.5 | | |
| Chelating agent | Sodium citrate | | | | | 1 | | 4.5 |
| | Sodium gluconate | 1 | | | | | 1 | |
| | Tetrasodium glutamate diacetate | | | | | | | |
| | Trisodium methylglycine diacetate | | | 0.5 | | | | |
| | Sodium ethylenediamine disuccinate | | | | | | | |
| | Sodium glucoheptonate | | 0.2 | | 0.3 | | | |
| | Essence | 0.5 | 0.8 | | 0.5 | 1 | 5 | |
| | Plant extract | | | 0.5 | 1 | | | |
| | Water | 12.5 | 27 | 25 | 26.2 | 32 | 57 | 47.6 |
| | Total | 100 | 100 | 100 | 100 | 100 | 100 | 100 |
| | Total surfactant: plant polysaccharide | 0.97 | 4.60 | 1.41 | 1.62 | 2.38 | 1.65 | 1.67 |
| | Plant polysaccharide: shape promoting agent | 4.25 | 2.5 | 3.67 | 5.25 | 2.89 | 3.33 | 5.00 |
| | Anionic surfactant: softening and antistatic agent | 4.89 | 7 | 4.67 | 5.5 | 4.10 | 5 | 16.6 |
| | Strongly cationic softening and antistatic agent: nonionic to weakly cationic softening and antistatic agent | 8 | 2 | 8 | 3 | 9 | 1 | 1 |

In the above examples, the cationic wheat protein derivative was purchased from Croda Chemicals (Shanghai) Co., Ltd., with the model number Coltide Radiance; the quaternized wheat protein was purchased from Croda Chemicals (Shanghai) Co., Ltd., with the model number Coltide HQS; the methyl sulfate [ethoxylated cocoalkyl bis(hydroxyethyl) ammonium formate] was purchased from Evonik Specialty Chemicals (Shanghai) Co., Ltd., with the model number REWOQ UAT CPEM; the dodecyl hydroxyethyl quaternary ammonium salt was purchased from China Research Institute of Daily Chemical Industry, with the model number K3; the hydrolyzed wheat protein/silicone copolymer was purchased from Croda Chemicals (Shanghai) Co., Ltd., with the model number Coltide HSI; and the hydrolyzed wheat protein/PVP copolymer was purchased from Croda Chemicals (Shanghai) Co., Ltd., with the model number Coltide HPVP.

Comparative Example 1

The difference from Example 3 lies in that the raw material and method for preparing the detergent composition are different, and the details are as follows:

raw material: the addition amount of the plant polysaccharide was 0, and polyvinyl alcohol was newly added, and the mass percentage of polyvinyl alcohol was 15%.

Preparation method: the polyvinyl alcohol was mixed with water at 90° C. until the polyvinyl alcohol swelled and fully dissolved; the chelating agent and the anionic surfactant were added, and dissolved for 15 min; then the builder, the nonionic surfactant, the amphoteric surfactant, the strongly cationic softening and antistatic agent, and the nonionic to weakly cationic softening and antistatic agent were successively added; and then the shape promoting agent, the builder, the enzymatic preparation and the essence were added to obtain the detergent composition.

Comparative Example 2

The difference from Example 8 lies in that the addition amount of dodecyl hydroxyethyl quaternary ammonium salt was 8.8%, the addition amount of water was 7.7%, and the mass ratio of the anionic surfactant to the softening and antistatic agent (the strongly cationic softening and antistatic agent and the nonionic to weakly cationic softening and antistatic agent) was 2.36:1.

Comparative Example 3

The difference from Example 8 lies in that the addition amount of dodecyl hydroxyethyl quaternary ammonium salt was 1.16%, the addition amount of water was 15.34%, and the mass ratio of the anionic surfactant to the softening and antistatic agent was 19:1.

Comparative Example 4

The difference from Example 1 lies in that the cationic wheat protein derivative was replaced with an equal mass of tallowtrimonium chloride.

Comparative Example 4 yielded a slurry containing flocculent aggregates.

Comparative Example 5

The difference from Example 1 lies in that the addition amount of hydroxypropyl starch ether was 9% and the addition amount of water was 21%, a ratio of the total mass of anionic surfactant, nonionic surfactant and amphoteric surfactant to the mass of plant polysaccharide was 5.56:1.

Comparative Example 6

The difference from Example 8 lies in that the addition amount of isotridecanol ethoxylate was 3%, the addition amount of cocamido propyl hydroxy sulfobetaine was 2%, and the addition amount of water was 15.5%, a ratio of the total mass of anionic surfactant, nonionic surfactant and amphoteric surfactant to the mass of plant polysaccharide was 0.79:1.

Comparative Example 7

The difference from Example 1 lies in that the hydrolyzed wheat protein/silicone copolymer was omitted, and the addition amount of dodecyl hydroxyethyl quaternary ammonium salt was 4.5%.

Application Example 1

A detergent tablet produced by drying and then slicing the detergent composition prepared in Example 1.

The drying method is a casting method, specifically the slurry was cast and then formed through air-blowing drying equipment.

Application Examples 2-14

Application Examples 2-14 differ from Application Example 1 in that the detergent tablets of Application Examples 2-14 were respectively formed by drying and then slicing the detergent compositions prepared in Examples 2-14.

The detergent tablets prepared in Application Examples 1-14 all exhibit complete formation and good flexibility.

Comparative Application Examples 1-7

Comparative Application Examples 1-7 differ from Application Example 1 in that the detergent tablets of Comparative Application Examples 1-7 were respectively formed by drying and then slicing the detergent compositions prepared in Comparative Examples 1-7.

During the preparation of the detergent tablet in Comparative Application Example 5, the product fragmented, failing to form a continuous film or intact tablet.

Performance Test

The detergent tablets prepared in the Application Examples and Comparative Application Examples were subjected to the following tests.

1. Fabric stain-removing test: The detergency is determined according to GB/T 13174-2021 "Determination of detergency and cycle of washing property for laundry detergents", the washing water is 250 mg/kg $CaCl_2$ hard water, the test cloth is national standard carbon black JB-01 dirty cloth, national standard protein JB-02 dirty cloth and national standard sebum JB-03 dirty cloth. The stain-removing ratio (Pi) was determined at a sample concentration of 0.05%, with a 0.2% standard liquid detergent as a control, wherein when Pi≥1.0 was qualified, Pi<1.0 was unqualified, and the test results are as shown in Table 3.

TABLE 3

| Stain-removing ratio (Comparison with standard solution) | National standard carbon black-soiled fabric | National standard protein-soiled fabric | National standard sebum-soiled fabric | General stain-removing |
|---|---|---|---|---|
| Application Example 1 | 1.47 | 1.75 | 1.12 | 4.34 |
| Application Example 2 | 1.58 | 1.79 | 1.24 | 4.61 |
| Application Example 3 | 1.57 | 1.73 | 1.17 | 4.47 |
| Application Example 4 | 1.57 | 1.78 | 1.03 | 4.38 |
| Application Example 5 | 1.68 | 1.31 | 1.51 | 4.5 |
| Application Example 6 | 1.60 | 1.81 | 1.14 | 4.55 |
| Application Example 7 | 1.67 | 1.85 | 1.12 | 4.64 |
| Application Example 8 | 1.79 | 1.38 | 1.63 | 4.8 |
| Application Example 9 | 1.46 | 1.77 | 1.19 | 4.42 |
| Application Example 10 | 1.53 | 1.77 | 1.17 | 4.47 |
| Application Example 11 | 1.48 | 1.39 | 1.54 | 4.41 |
| Application Example 12 | 1.53 | 1.81 | 1.51 | 4.85 |
| Application Example 13 | 1.67 | 1.58 | 1.14 | 4.39 |
| Application Example 14 | 1.49 | 1.36 | 1.20 | 4.05 |
| Comparative Application Example 1 | 1.02 | 1.24 | 0.98 | 3.24 |
| Comparative Application Example 2 | 1.51 | 1.23 | 1.51 | 4.25 |
| Comparative Application Example 3 | 1.43 | 1.00 | 0.82 | 3.25 |
| Comparative Application Example 4 | 1.17 | 1.01 | 0.85 | 3.03 |
| Comparative Application Example 5 | Failing to form an intact tablet | | | |
| Comparative Application Example 6 | 0.99 | 0.98 | 0.92 | 2.89 |
| Comparative Application Example 7 | 1.34 | 1.57 | 1.02 | 3.93 |

It can be seen from the above test results that the detergent tablets obtained by using the plant polysaccharide to replace polyvinyl alcohol film-forming agents in the examples have superior stain-removing performance. By optimizing the mass ratio between the anionic surfactant and the softening and antistatic agent, as well as the mass ratio of total surfactants to the plant polysaccharide, maximal stain-removing efficacy is achieved.

2. Water solubility test: The test was conducted according to QB/T5779-2023 “Laundry Tablets”. Specifically, a 1 L beaker filled with 700 mL hard water (250 mg/kg calcium chloride) was placed in a 23±2° C. water bath, magnetic stirring speed was adjusted, and laundry tablets were cut into 3 cm×3 cm squares, vertically dropped from 10 cm above the water surface parallel to the water. Timing began upon water contact of the laundry tablets and ceased upon complete dispersion, recording dissolution time. Tests were repeated 3 times in parallel, and the test results are as shown in Table 4.

3. Washing residue test for washing machine: four garments of different materials were prepared, a 4 g detergent tablet sample was placed in each garment or hem and secured with rubber bands, then the garments were wrapped in white fabric (two garments per fabric), and washed in a 39-minute machine cycle, then inspected for residues, and the test results are as shown in Table 4.

4. High-humidity test: The test was conducted according to QB/T5779-2023 “Laundry Tablets”. Specifically, a box of detergent tablets (with tablets stacked vertically inside) was placed under test environment of a temperature of 25±2° C. and relative humidity of 85±5% RH for 48 hours, and the test included 4 parallel groups. Taken out one group respectively to observe oil seepage on the paper packaging, and the test results are as shown in Table 4.

TABLE 4

| | Dissolution Time/sec | Machine wash residual condition | High-humidity stability |
|---|---|---|---|
| Application Example 1 | 76 | No residue | No oil seepage |
| Application Example 2 | 72 | No residue | No oil seepage |
| Application Example 3 | 57 | No residue | No oil seepage |
| Application Example 4 | 54 | No residue | No oil seepage |
| Application Example 5 | 50 | No residue | No oil seepage |
| Application Example 6 | 57 | No residue | No oil seepage |
| Application Example 7 | 49 | No residue | No oil seepage |
| Application Example 8 | 43 | No residue | No oil seepage |
| Application Example 9 | 80 | No residue | No oil seepage |
| Application Example 10 | 63 | No residue | No oil seepage |
| Application Example 11 | 67 | No residue | No oil seepage |
| Application Example 12 | 70 | No residue | No oil seepage |
| Application Example 13 | 72 | No residue | No oil seepage |
| Application Example 14 | 68 | No residue | No oil seepage |
| Comparative Application Example 1 | 53 | No residue | Minor oil seepage |
| Comparative Application Example 2 | 45 | No residue | Minor oil seepage |
| Comparative Application Example 3 | 49 | No residue | Minor oil seepage |
| Comparative Application Example 4 | 146 | Residue | Severe oil seepage |
| Comparative Application Example 5 | Failing to form an intact tablet | | |
| Comparative Application Example 6 | 233 | Residue | Severe oil seepage |
| Comparative Application Example 7 | 97 | No residue | No oil seepage |

It can be seen from the above test results that the detergent tablets prepared in the application examples exhibit shorter dissolution time, no washing residues, and no oil seepage in high-humidity environments.

5. Antistatic test: The test was conducted according to GB/T16801-2013 “Determination of Antistatic Performance for Fabric Conditioners”. Test concentration of detergent tablets to be tested was 5.0 g/L (solvent: 250 mg/L hard water), and logarithmic surface resistivity difference Δlgps≥2.5 is considered acceptable. Test polyester fabric was purchased from China National Research Institute of Daily Chemical Industry, and the test results are as shown in Table 5.

6. Fabric rewetting test: The test was conducted according to QB/T 4309-2023 “Determination of Rewettability of Fabrics Softener”. Test concentration of detergent tablets to be tested was 1.0 g/L (solvent: 250 mg/L of hard water). Softeners form a hydrophobic film on fiber surfaces, prolonging rewetting time. This extended rewetting time is an inherent side effect of softener efficacy, which may impair detergent wetting during subsequent washes and reduce stain-removing performance, and the test results are as shown in Table 5.

7. Fabric softness test: The test was conducted according to GB/T 8942-2016 “Paper-Determination of Softness”. Instrument model was DRK119 Softness Tester. Five cotton garments and cashmere fabrics were prepared separately and washed by using a 4 g detergent tablet in a 39-minute machine cycle, then air-dried and tested, and the test results are as shown in Table 5.

TABLE 5

| | Antistatic performance Logarithmic surface resistivity difference Δlgps | Rewettability of fabric Capillary effect time/s | Force mN (higher values indicate lower softness) Cashmere fabric |
|---|---|---|---|
| National standard laundry detergent | 1.2 | 25 | 3339. ± 54.0 |
| Application Example 1 | 5.4 | 34 | 1877.7 ± 58.1 |
| Application Example 2 | 4.4 | 31 | 2490.8 ± 69.0 |
| Application Example 3 | 4.2 | 35 | 1886.2 ± 56.3 |
| Application Example 4 | 4.5 | 36 | 2106.7 ± 38.2 |
| Application Example 5 | 4.9 | 34 | 2378.4 ± 53.6 |
| Application Example 6 | 5.3 | 33 | 2252.7 ± 50.2 |
| Application Example 7 | 3.4 | 28 | 2363.2 ± 68.1 |
| Application Example 8 | 4.7 | 33 | 1865.7 ± 41.9 |
| Application Example 9 | 4.3 | 30 | 2523.8 ± 21.1 |
| Application Example 10 | 4.4 | 34 | 2081.3 ± 26.3 |
| Application Example 11 | 4.1 | 32 | 2565.7 ± 41.9 |
| Application Example 12 | 3.7 | 40 | 1717.1 ± 96.0 |
| Application Example 13 | 3.5 | 35 | 2371.3 ± 34.3 |
| Application Example 14 | 3.2 | 32 | 2579.2 ± 48.1 |
| Comparative Application Example 1 | 3.0 | 26 | 2524.1 ± 717.0 |
| Comparative Application Example 2 | 2.92 | 40 | 2604.6 ± 723.0 |
| Comparative Application Example 3 | 2.11 | 45 | 2589.4 ± 741.4 |
| Comparative Application Example 4 | 2.28 | 39 | 3004.6 ± 723.0 |
| Comparative Application Example 5 | Failing to form an intact tablet | | |
| Comparative Application Example 6 | 3.92 | 94 | 2579.4 ± 770.0 |
| Comparative Application Example 7 | 2.5 | 35 | 29857 ± 648.0 |

It can be seen from the above test results that the detergent tablets prepared in the application examples simultaneously satisfy both antistatic and softening functional requirements.

8. Cashmere fabric washing test: cashmere fabrics were cut into 25 cm×25 cm pieces, with each piece's template dimensions recorded. Five small cotton garments and the pre-cut cashmere fabrics were put into a drum washing machine. A 4 g detergent tablet sample was weighed and added to the drum washing machine, then the wool washing mode was started. After washing was completed, the cashmere fabrics were taken out and air-dried under ambient conditions. This washing process was repeated for 10 times, following the final drying, the dimensions of the washed cashmere were measured against the templates, the area differentials were calculated, and the results are as shown in Table 6. The test condition of Application Example 1 is as shown in FIG. 1.

TABLE 6

| | Area before washing/ $cm^2$ | Area after washing/ $cm^2$ | Difference/ $cm^2$ | Condition of fabric |
|---|---|---|---|---|
| National standard laundry detergent (16 mL) | 645.16 | 571.21 | 73.95 | Coarse surface, prickling sense of hand, with evident damage to wool fibers |
| Application Example 1 | 637.56 | 618.02 | 19.85 | Smooth surface Soft, soft in tactile feel |
| Application Example 3 | 650.25 | 640.60 | 10.25 | Smooth surface Soft, soft in tactile feel |
| Application Example 8 | 642.62 | 636.55 | 6.07 | Smooth surface Soft, soft in tactile feel |
| Comparative Application Example 1 | 655.36 | 620.01 | 35.35 | Slightly rough surface, soft, and soft in tactile feel |

It can be seen from the above test results that the detergent tablets obtained by using the plant polysaccharide to replace polyvinyl alcohol film-forming agents in the examples exhibit superior softening effects on cashmere fabrics.

9. Metal corrosion test: 304 stainless-steel sheet and 316 stainless-steel sheet were selected, the stainless-steel sheets coated with the slurry of the fabric-softening, garment-care and stain-removing detergent composition were placed on a steam pipeline, the temperature was controlled at 50° C. and 80° C. respectively to simulate the high-temperature environment of the product in the actual production process. It is ensured that the stainless-steel sheet is in sufficient contact with the heat source so that the slurry can be uniformly heated. After 24 h, each area was gently wiped with a cleaning fabric to remove residual slurry and observe for signs of corrosion, such as rust, discoloration, spots, pits, or black spots, and the results are as shown in Table 7.

TABLE 7

| | 50° C. | | 80° C. | |
|---|---|---|---|---|
| | 304 Stainless-steel | 316 Stainless-steel | 304 Stainless-steel | 316 Stainless-steel |
| Application Example 3 | All showed no abnormalities | | | |
| Comparative Application Example 1 | Small black spots appeared on the surface of the stainless-steel sheets, indicating that the slurry exhibits certain corrosivity to the stainless-steel sheets. | | | |

This specific embodiment is merely an explanation of the present application and is not a limitation of the present application. A person skilled in the art, after reading the present specification, would have been able to make modifications to the present embodiment as required without inventive contribution, but only within the scope of the claims of the present application are protected by the patent law.

What is claimed is:

1. A detergent composition, wherein a raw material for preparing the detergent composition comprises the following components by mass percentages:

anionic surfactant: 5-30%; nonionic surfactant: 5-20%; amphoteric surfactant: 1-10%; plant polysaccharide: 10-35%; builder: 5-20%; shape promoting agent: 2-10%; softening and antistatic agent: 0.5-5%; enzymatic preparation: 0-5%; chelating agent: 0.1-5%; essence: 0-5%; and a balance of water;

a ratio of a total mass of the anionic surfactant, the nonionic surfactant, and the amphoteric surfactant to a mass of the plant polysaccharide is (0.9-5):1, a mass ratio of the anionic surfactant to the softening and antistatic agent is (3-17):1, the softening and antistatic agent comprises a strongly cationic softening and antistatic agent and a nonionic to weakly cationic softening and antistatic agent;

the strongly cationic softening and antistatic agent comprises one or more of cationic wheat protein derivatives, quaternized wheat protein, methyl sulfate [ethoxylated cocoalkyl bis(hydroxyethyl) ammonium formate], or dodecyl hydroxyethyl quaternary ammonium salt; and the nonionic to weakly cationic softening and antistatic agent comprises one or more of hydrolyzed wheat protein/silicone copolymer, or hydrolyzed wheat protein/polyvinyl pyrrolidone (PVP) copolymer.

2. The detergent composition according to claim 1, wherein a mass ratio of the strongly cationic softening and antistatic agent to the nonionic to weakly cationic softening and antistatic agent is (1-10):1.

3. The detergent composition according to claim 1, wherein the plant polysaccharide comprises one or more of hydroxypropyl starch ether, hydroxypropyl methyl cellulose, carboxymethyl chitosan, guar gum, Arabic gum, locust bean gum, cassia gum, xanthan gum, alginate, or sodium carboxymethyl cellulose.

4. The detergent composition according to claim 1, wherein the anionic surfactant comprises one or more of sodium α-olefin sulfonate, sodium fatty alcohol polyoxyethylene ether sulfate, $C_8$-$C_{22}$ fatty acid salt, modified oil ethoxylated sulfonate, or fatty acid methyl ester ethoxylate sulfonate.

5. The detergent composition according to claim 1, wherein the nonionic surfactant comprises one or more of alkyl polyglucoside, coconut acid methyl ester ethoxylate, modified oil ethoxylate, secondary alcohol ethoxylate, isotridecanol ethoxylate, or polyoxyethylene-polyoxypropylene block copolymer; and the amphoteric surfactant comprises one or more of dodecyl dimethyl betaine, cocamido propyl hydroxy sulfobetaine, cocoalkyl dimethylamine oxide, or cocoalkyl bis(hydroxyethyl)amine oxide.

6. The detergent composition according to claim 1, wherein the shape promoting agent comprises a $C_3$-$C_8$ polyol.

7. A method for preparing the detergent composition according to claim 1, comprising the following steps:

mixing the plant polysaccharide with the shape promoting agent under stirring to wet a solid powder of the plant polysaccharide with the shape promoting agent to obtain a premix;

mixing the anionic surfactant with a pre-heated water, and after standing until completely dissolved into a homogeneous phase, adding the premix in batches under stirring to obtain a mixture; and adding the builder to the mixture, stirring until uniform, then adding the nonionic surfactant and the amphoteric surfactant, adding the chelating agent to adjust a value of pH to 5.5-7, then adding the softening and antistatic agent, continuing the stirring, and adding the enzymatic preparation in liquid form and the essence to obtain the detergent composition.

8. A detergent tablet, wherein the detergent tablet is produced by drying and then slicing the detergent composition according to claim 1; wherein, when the enzymatic preparation in the detergent composition is in a solid form, the enzymatic preparation is not added during preparation of the detergent composition, but is instead sprinkled onto sliced tablets.

* * * * *